United States Patent [19]

Dosiere et al.

[11] Patent Number: 5,471,641
[45] Date of Patent: Nov. 28, 1995

[54] TELECOMMUNICATIONS NETWORK HAVING SWITCHING CENTERS FOR LINKING SATELLITES

[75] Inventors: Frédéric Dosiere, Toulouse; Jean-Pierre Boutes, Ramonville; Gérard Maral, Goyrans, all of France

[73] Assignee: France Telecom, Paris, France

[21] Appl. No.: 122,720

[22] Filed: Sep. 15, 1993

[30] Foreign Application Priority Data

Sep. 15, 1992 [FR] France .................... 92 10948

[51] Int. Cl.$^6$ ..................... H04B 7/14
[52] U.S. Cl. ..................... 455/13.1; 455/13.2
[58] Field of Search ............. 455/12.1, 13.1, 455/13.2, 13.3, 56.1

[56] References Cited

U.S. PATENT DOCUMENTS 3,497,807  2/1970  Newton .................... 455/13.3

FOREIGN PATENT DOCUMENTS 0365885  5/1990  European Pat. Off. .

OTHER PUBLICATIONS

*Military Communications in a Changing World*, Milcom '91, vol. 2, IEEE Communications Society.

Primary Examiner—Reinhard J. Eisenzopf
Assistant Examiner—Andrew Faile
Attorney, Agent, or Firm—Nilles & Nilles

[57] ABSTRACT

A telecommunications network comprises a constellation of orbiting satellites placed in low-altitude polar inclined orbits with two inter-satellite links per satellite, a network of earth-based centers enabling the management and the control of the local traffic and one or more high latitude centers to set up the interconnections between satellites that are not in one and the same orbit. Application to telephony by mobile and/or fixed terminals.

10 Claims, 3 Drawing Sheets

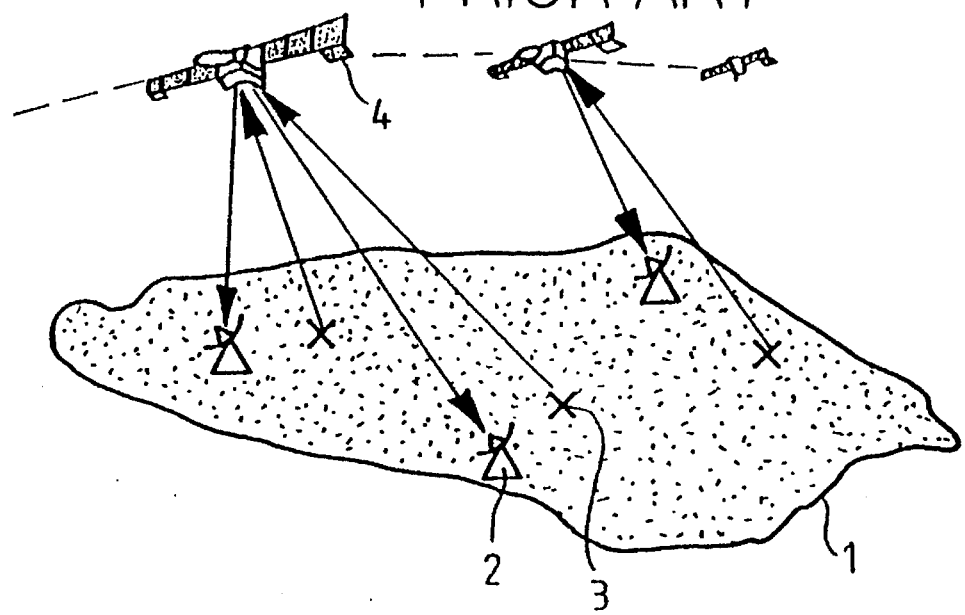
FIG_1
PRIOR ART
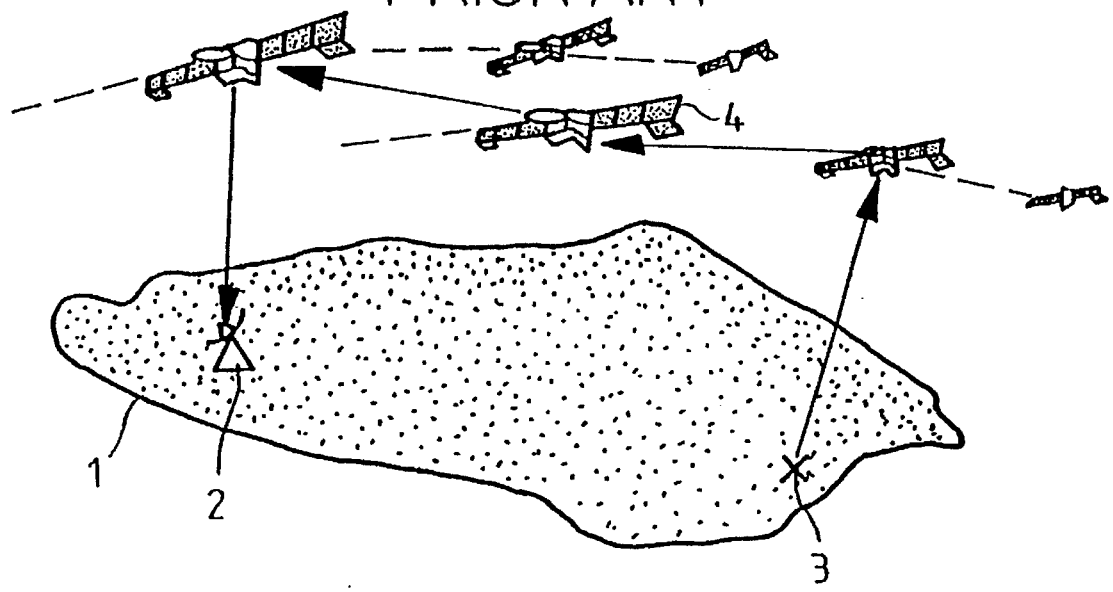
FIG_2
PRIOR ART

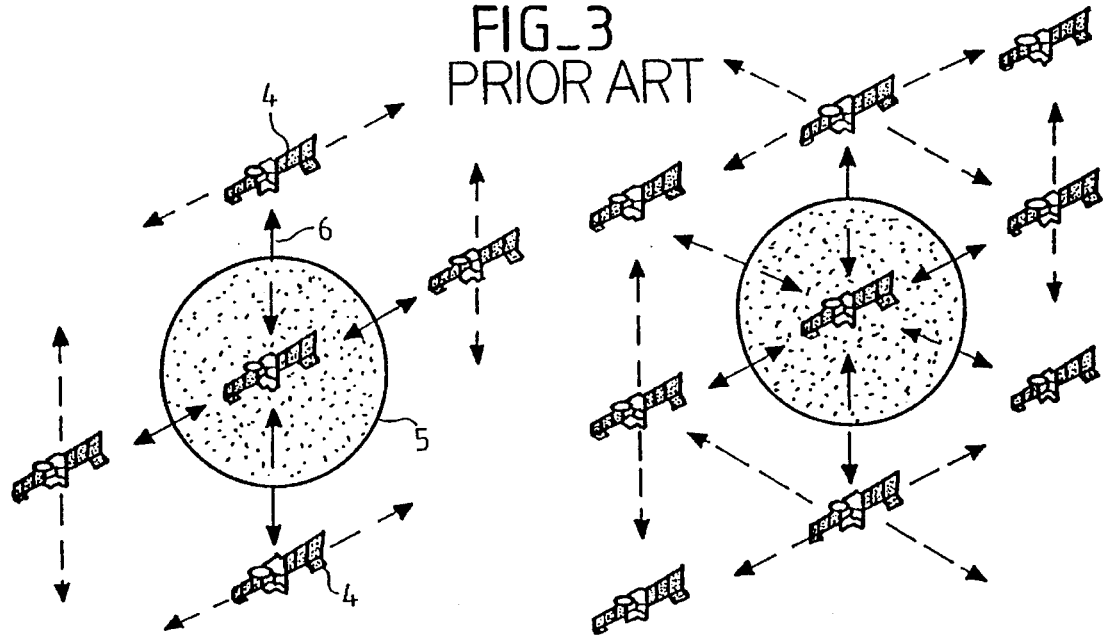
FIG_3
PRIOR ART
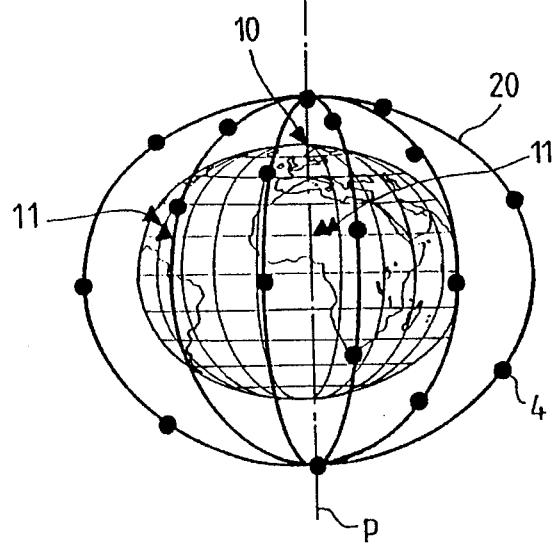
FIG_4

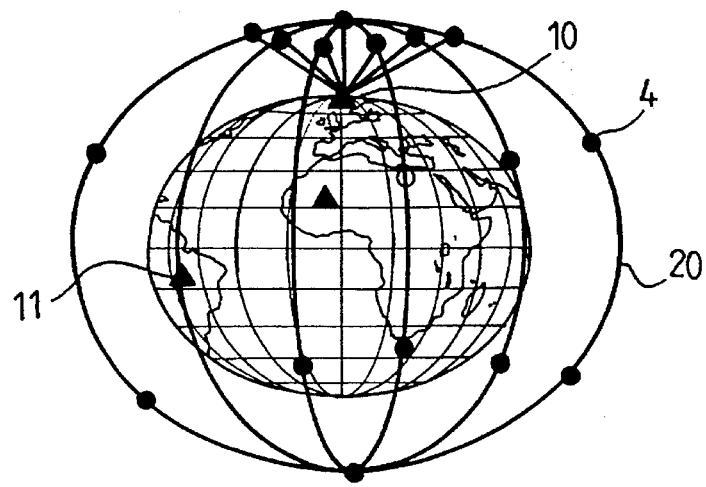
FIG_5
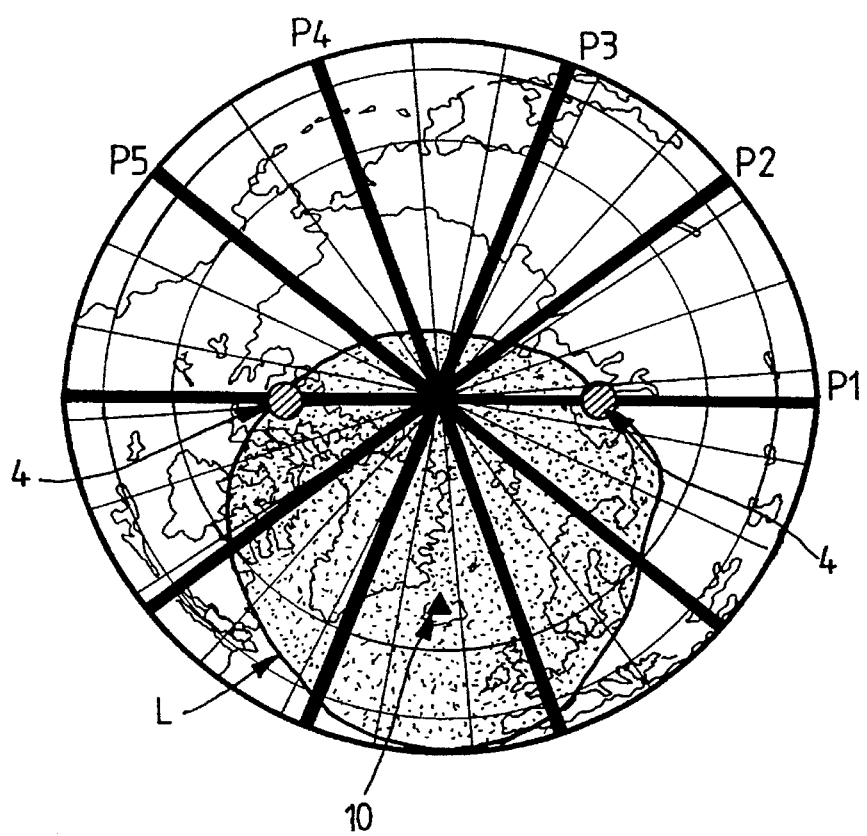
FIG_6

TELECOMMUNICATIONS NETWORK HAVING SWITCHING CENTERS FOR LINKING SATELLITES

BACKGROUND OF THE INVENTION

1. Field of the Invention

The invention relates to a telecommunications network comprising ground installations such as earth-based switching centers and satellites used for transmitting certain communications.

Telephone systems have made immense progress in the past quarter of a century. Today, they make use of geostationary satellites rotating at 36,000 km above transmitter points, these satellites being truly space telephone centers.

However, the advances being made are not limited to these features. New projects are beginning to emerge wherein every single individual, wherever he or she may be located, will be able to communicate with any point throughout the planet by means of small, portable transceiver sets.

Indeed, telecommunications systems that use moving constellations of orbiting satellites are now being seriously considered for telephony and message systems.

Telecommunications systems such as these are based on the use of small-sized satellites placed in low orbits.

All the satellites of a constellation can be used to set up a telecommunications network providing for an exchange of information between fixed or mobile users (ships, aircraft and cars), distributed over a defined services zone (for example USA or Europe) or throughout the planet.

This type of communications system should make it possible to cope with the growing need for new services such as links among portable terminals, car phones and services related to message systems.

2. Description of the Prior Art

Two major approaches are currently envisaged for the implementation and distribution of services such as these:

- local transmission limited to a country or a group of countries, for example USA, Europe etc.;
- worldwide transmission, every point of the planet being covered by the system.

Throughout the following description, the expression "links between satellites" is understood to mean links that are set up by going through a station on the ground. The expression "inter-satellite" links is understood to mean direct links between satellites.

FIG. 1 shows the structure of a constellation telephone network, enabling the local transmission of calls sent by telecommunication terminals 3, whether portable or non-portable.

The present structure used to obtain a local telephone service is based on a constellation of satellites 4 ensuring the visibility of the service zone 1 associated with a network of earth stations 2.

The earth stations 2 enable the management or control of communications, the management or control of the hand-over process (i.e. the continuity of the links) and the interconnection with existing earth-based telecommunications networks.

However, the size of such a network is dependent on the configuration of the network of stations on the ground. The service is related to the layout of a station on the ground and gives this network a local character.

FIG. 2 shows a structure of a constellation telephone network enabling worldwide transmission. In a network such as this, inter-satellite links are implemented to convey communications via the space network, in order to limit the network of earth stations. With the possibility of conveying communications via the space network, the service zone of the telecommunications system no longer depends on the layout of the network on the ground and depends solely on the characteristics of visibility of the constellation.

The following publications provide a description of current knowledge on the subject:

[BES 78] D. C. BESTE, "Design of Satellite Constellations for Optimal Continuous Coverage", IEEE Trans. on Aerospace and Electronic Systems, Vol. AES-14, No. 3, pp. 466–473, May 1978.

[BAL 78] A. H. BALLARD, "Rosette Constellations of Earth Satellites", IEEE Transactions on Aerospace and Electronic Systems, Vol. AES-16, No. 5, September 1980.

[BIN 87] R. BINDER, S. D. HUFFMANN, I. GURANTZ, P. A. VENA, "Crosslink Architectures for a Multiple Satellite System", Proceedings of the IEEE, Vol 75, No 1, pp. 74–82, January 87.

[IRI 90] Application of Motorola Satellite Communications, Inc. "IRIDIUM, A Low Earth Orbit Mobile Satellite System", before the Federal Communications Commission, Washington DC, December 90.

[KAT 92] J. KANIYIL, J. TAKEI, S. SHIMAMOTO, Y. ONOZATO, T. USUI, I. OKA, T. KAWABATA, "A Global Message Network Employing Low Earth Orbiting Satellites", IEEE Selected Areas in Communications, Vol. 10, No. 2, pp. 418–427, February 92.

[MAR 91] G. MARAL and J. J. DERIDDER, "Basic Concepts of Low Earth Orbit Satellite Systems for Communications", Telecom Paris-ENST, 1991.

[RID 86] L. RIDER, "Analytic Design of Satellite Constellations for Zonal Earth Coverage Using Inclined Circular Orbits", The Journal of Astronomical Sciences, Vol. 34, No. 1, January–March 1986, pp. 31–64;

[RID 87] L. RIDER and W. S. ADAMS, "Circular Polar Constellations Providing Single or Multiple Coverage Above A Specified Latitude", The Journal of Astronomical Sciences, Vol. 35, No. 2, April–June 1987, pp. 155–192.

[WAL 77] J. G. WALKER, "Continuous Whole-Earth Coverage by Circular-Orbit Patterns", Technical Report 77044, Royal Aircraft Establishment, Mar. 24, 1977.

Among all the systems described in these publications, reference may be made to the project "IRIDIUM" (registered mark) which is designed for worldwide transmission .and, in its latest development, is based on the use of 66 small satellites moving in low earth orbit, linked with earth-based switching centers distributed throughout the world.

According to this project, calls sent out by a portable terminal are picked up by a satellite and conveyed either to other satellites by inter-satellite links or, in the case of a local call, to the earth station seen by this satellite.

For this purpose, each satellite has equipment enabling the setting up of a number of inter-satellite links greater than or equal to four. This equipment is heavy and complex, for it comprises four to six antennas and mechanisms to control the orientation of these antennas.

Given that 90% of the traffic is local, to implement the 10% that constitutes international traffic, the complexity entailed in setting up inter-satellite links according to this approach would appear to be prohibitive.

The present invention makes it possible to overcome these drawbacks.

Indeed, the present invention enables the associating of the following two concepts:

enabling the conveying of all the traffic;

minimizing the additional complexity entailed in the transmission of worldwide communications as compared with a local transmission system.

The geometrical structure of the network proposed according to the invention can also be used to simplify the management or control of the telecommunications and considerably minimize the problems of routing caused by a constellation structure with a large number of inter-satellite links.

SUMMARY OF THE INVENTION

More particularly, an object of the present invention is a telecommunications network comprising earth-based switching centers and a constellation of satellites travelling in low earth orbit wherein, mainly, the constellation is formed by several sets of satellites having orbits in planes that contain the polar axis or an axis slightly inclined with respect to this axis, wherein the sets are such that the satellites placed in the same orbit can communicate in groups of two, and are such that any terrestrial point of the service zone, whether it is a sender point or an addressee point, is seen by at least one satellite of these sets and wherein at least one switching center is placed at a high latitude so that at least one satellite of each set is seen by this switching center at each instant, so that this center provides for the links between the satellites that are not in the same orbit.

According to the invention, each satellite has equipment enabling two inter-satellite links to be set up, one link to communicate with the satellite placed upline and the other link to communicate with the satellite placed downline in the orbit.

According to the invention, the constellation may be formed, for example, by five sets of eight satellites, the satellites of one and the same set travelling in one and the same orbit, the five orbits intersecting above the zone of visibility of the switching center placed at a high latitude.

BRIEF DESCRIPTION OF THE DRAWINGS

Other characteristics and advantages of the invention shall appear from the following description, made on a non-restrictive basis with reference to the drawings, of which:

FIG. 1 shows a structure of constellation telephone networks enabling local transmission according to the prior art;

FIG. 2 shows a structure of a constellation telephone network enabling worldwide transmission according to the prior art;

FIG. 3 shows a constellation with four or six inter-satellite links per satellite according to the prior art;

FIG. 4 is a schematic view of the telecommunications network according to the invention;

FIG. 5 is a schematic view that illustrates the interconnection between orbit planes through the center placed at high latitude;

FIG. 6 is a schematic view that illustrates the geometrical conditions for the visibility of the station.

MORE DETAILED DESCRIPTION

FIGS. 1, 2 and 3 have already been described to illustrate the prior art.

FIG. 4 gives a schematic view of a telecommunications network according to the invention. This drawing shows a constellation of polar inclined orbiting satellites. According to the invention, the constellation is formed by several sets of satellites distributed in orbits 20 that are in planes containing the polar axis P or an axis slightly inclined with respect to this axis, the orbital planes thus formed intersecting above two terrestrial zones that are at very high latitude.

According to the invention, in one of these zones at very high latitude (or in both of them), the network comprises an earth-based center 10 that provides for the switching of the telephone calls coming from the satellites that pass over its field of vision. This center avoids the need for inter-satellite links between satellites that are not in the same orbit. Thus, the center sets up the interconnections between the different satellites placed in distinct orbits.

According to the invention, the inter-satellite links are reduced to two per satellite. Each satellite placed in one and the same orbit has equipment enabling it to set up these inter-satellite links solely with the satellite that follows it and the satellite that precedes it in the orbit.

Thus, the equipment is reduced to two antennas, one being pointed to the satellite that follows this satellite in the orbit and the other being pointed towards the satellite that precedes it.

The network also comprises earth-based communications stations 11 distributed over the various continents so as to provide for local communications. Thus, in the event of local communications, a call sent from a portable terminal (for example) is received by the satellite which observes the region in which this call has been sent, receives the call and sends it to the local communications center which will act as a relay for the corresponding addressee.

In the event of international communications, the call sent by a portable terminal is conveyed through the orbital plane up to the zone of visibility of the switching center placed at very high latitude. This call is transmitted to this center which switches it over towards a satellite placed in the orbital plane that will enable the addressee to be served.

FIG. 5 illustrates the interconnectivity among planes by the high latitude center. This figure shows a center 10 placed at the North Pole or at least in a region close to the North Pole. Of course, another center could be placed at the South Pole or in the vicinity of the South Pole, instead of the center placed at the North Pole or in addition to the center placed at the North Pole.

FIG. 6 illustrates a particular example of a configuration according to the invention. According to this example, by placing satellites in orbits at an altitude of 1500 km, worldwide visibility is achieved by placing 40 satellites distributed over five orbital planes with eight satellites per plane. The five planes are numbered P1 to P5 in FIG. 6.

FIG. 6 provides an illustration of the limit conditions of visibility L of two satellites 4 placed in the plane No. 1 for a center at very high latitude placed as shown in this figure. The choice of the location of this center is such that it should provide for the interconnection of all the planes with one another. This FIG. 6 makes it possible precisely to represent the geometrical condition, as regards the latitude of the center, that is necessary to enable all the planes to be interconnected with one another through the center. According to this example, the switching center at very high latitude could be set up, for example, in Iceland.

What is claimed is:

1. A telecommunications network comprising:

a first earth-based switching center; and a plurality of sets of satellites;

wherein the satellites travel in low earth orbits, the orbits being in planes that contain the polar axis or an axis slightly inclined with respect to the polar axis, wherein the satellites that are in the same orbit can communicate in groups of two, wherein every terrestrial point of a service zone is seen by at least one satellite, and wherein the first switching center is placed at a high latitude so that at least one satellite of each set is seen by the first switching center at each instant, so that the first switching center establishes a first link between satellites that are not in the same orbit.

2. A telecommunications network according to claim 1, wherein each satellite has equipment enabling first and second inter-satellite links to be established, the first link to be established with the preceding satellite and the second link to be established with the subsequent satellite.

3. A telecommunications network according to claim 1, further comprising a second earth-based switching center placed at a high latitude so that at least one satellite of each set is seen by the second switching center at each instant, so that the second switching center establishes a second link between satellites that are not in the same orbit.

4. A telecommunications network according to claim 1, wherein there are five sets of satellites, and wherein each set of satellites comprises eight satellites.

5. A telecommunications network according to claim 1, wherein the satellites travel in orbits that are at an altitude of 1500 km.

6. A method of telecommunicating comprising the steps of:

transmitting a signal from an earth-based sending point to a first satellite, the first satellite traveling in a first orbit which is in a plane that includes the polar axis or an axis slightly inclined with respect to the polar axis;

transmitting the signal from the first satellite to an earth-based switching center;

transmitting the signal from the earth-based switching center to a second satellite, the second satellite traveling in a second orbit which is different than the first orbit and which is in a plane that includes the polar axis or an axis slightly inclined with respect to the polar axis; and transmitting the signal from the second satellite to an earth-based receiving point.

7. A system for transmitting signals from an earth-based sending station to an earth-based receiving station, the transmission system comprising:

a plurality of sets of satellites,
wherein the satellites that are in the same set have the same orbit,
wherein inter-satellite communications occur only between satellites that are in the same set,
wherein satellites communicate with earth-based sending stations and the earth-based receiving stations, and
wherein every terrestrial point of a service zone can be seen by at least one satellite; and a first earth-based switching station for relaying signals between different sets of satellites,
wherein the first switching station communicates with the different sets of satellites thereby establishing a first link between the different sets of satellites, and
wherein the first switching station can be seen by at least one satellite of each of the plurality of sets of satellites.

8. A transmission system according to claim 7, further comprising a second earth-based switching for relaying signals between different sets of satellites, wherein the second switching station communicates with the different sets of satellites thereby establishing a second link between the different sets of satellites, and wherein the second switching station can be seen by at least one satellite of each of the plurality of sets of satellites.

9. A transmission system according to claim 7, wherein there are five sets of satellites, and wherein each set of satellites comprises eight satellites.

10. A transmission according to claim 7, wherein the satellites travel in orbits that are at an altitude of 1500 km.

* * * * *